United States Patent
Hong et al.

(10) Patent No.: US 8,395,709 B2
(45) Date of Patent: Mar. 12, 2013

(54) 3D VIDEO PROCESSING

(75) Inventors: Sunkwang Hong, Toronto (CA); Samir N. Hulyalkar, Newtown, PA (US)

(73) Assignees: ATI Technology ULC, Markham (CA); Advanced Micro Devices, Inc., Sunnyvale, CA (US)

( * ) Notice: Subject to any disclaimer, the term of this patent is extended or adjusted under 35 U.S.C. 154(b) by 681 days.

(21) Appl. No.: 12/397,448

(22) Filed: Mar. 4, 2009

(65) Prior Publication Data
US 2010/0225741 A1 Sep. 9, 2010

(51) Int. Cl.
*H04N 5/14* (2006.01)

(52) U.S. Cl. ............ 348/699; 348/43; 348/452; 382/154

(58) Field of Classification Search ............... 348/44, 348/699, 700, 208.4, 43, 452; 375/240.12, 375/240.01; 386/124; 382/154
See application file for complete search history.

(56) References Cited

U.S. PATENT DOCUMENTS

| | | | |
|---|---|---|---|
| 6,477,267 B1 | 11/2002 | Richards | |
| 2003/0112873 A1 | 6/2003 | Demos | |
| 2004/0057517 A1 | 3/2004 | Wells | |
| 2004/0252756 A1* | 12/2004 | Smith et al. | 375/240.01 |
| 2007/0064800 A1* | 3/2007 | Ha | 375/240.12 |
| 2008/0231745 A1 | 9/2008 | Ogino et al. | |
| 2008/0246836 A1 | 10/2008 | Lowe et al. | |
| 2008/0246848 A1* | 10/2008 | Tsubaki et al. | 348/208.4 |
| 2009/0142041 A1* | 6/2009 | Nagasawa et al. | 386/124 |
| 2009/0268097 A1* | 10/2009 | Lin et al. | 348/700 |
| 2010/0302451 A1* | 12/2010 | Ishikawa | 348/699 |
| 2011/0050853 A1* | 3/2011 | Zhang et al. | 348/44 |

* cited by examiner

*Primary Examiner* — Jungwon Chang
(74) *Attorney, Agent, or Firm* — Volpe and Koenig, P.C.

(57) ABSTRACT

A method and apparatus for reducing motion judder in a 3D input source are disclosed. The 3D input source is separated into left and right images. Motion vectors for the left and right images are calculated. Frame rate conversion is performed on the left and right images, to produce motion compensated left and right images. The left and right images and the motion compensated left and right images are reordered for display. Alternatively, the motion estimation and motion compensation can be performed on the 3D input source, and the input image and the motion compensated image can then be separated into respective left and right images. The method and apparatus can be adapted to perform 2D to 3D conversion by extracting a 2D input source into left and right 3D images and performing motion estimation and motion compensation.

5 Claims, 10 Drawing Sheets

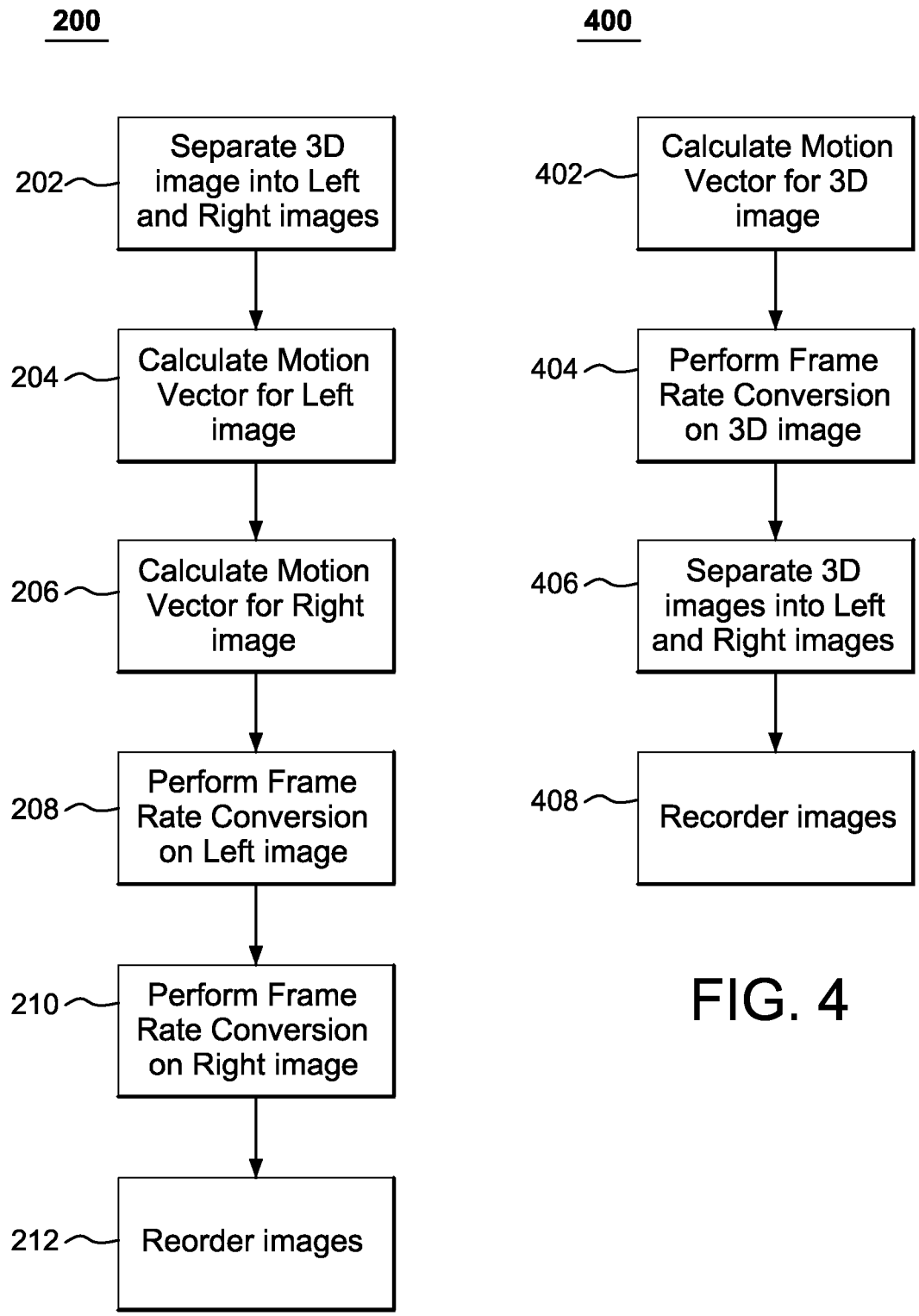

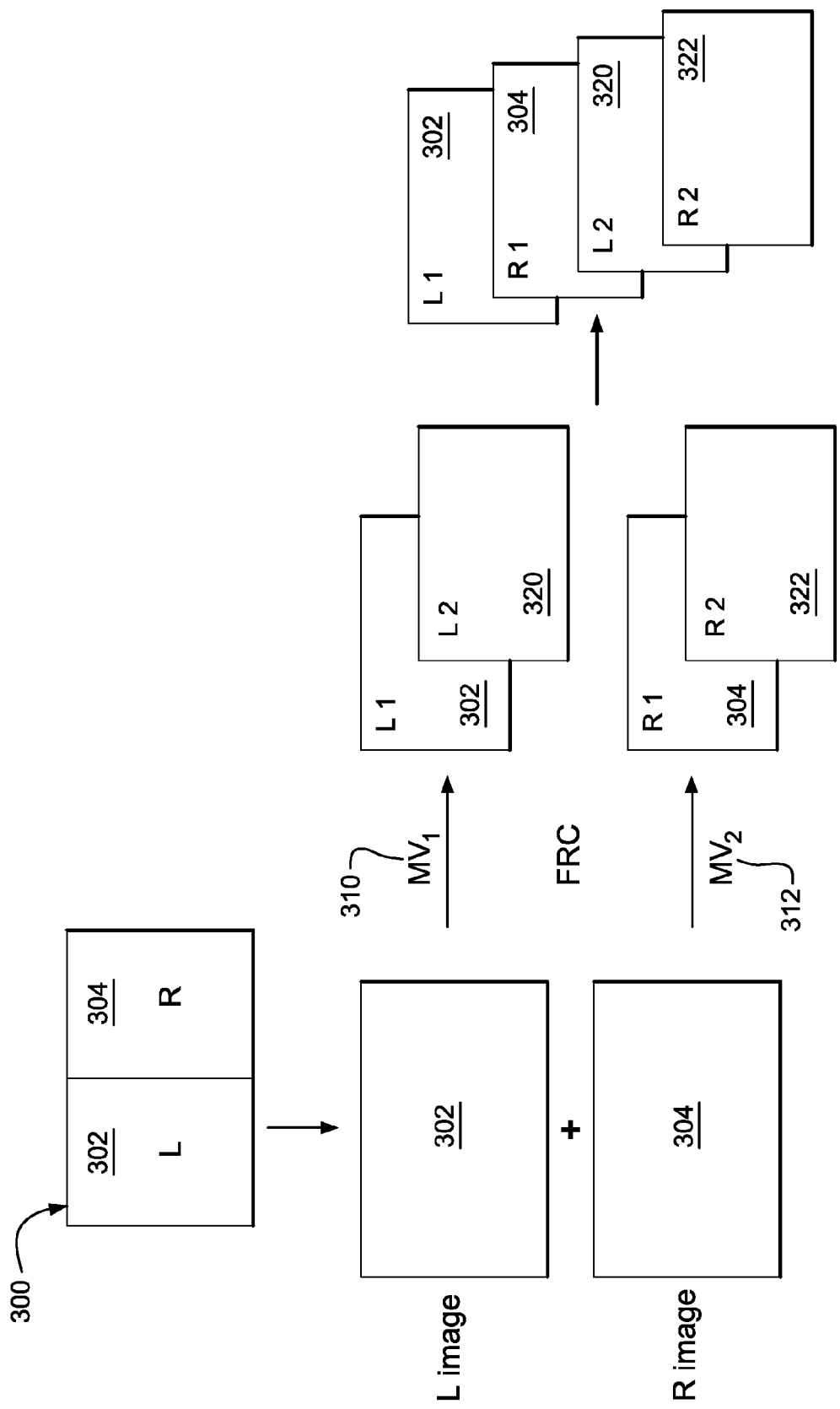

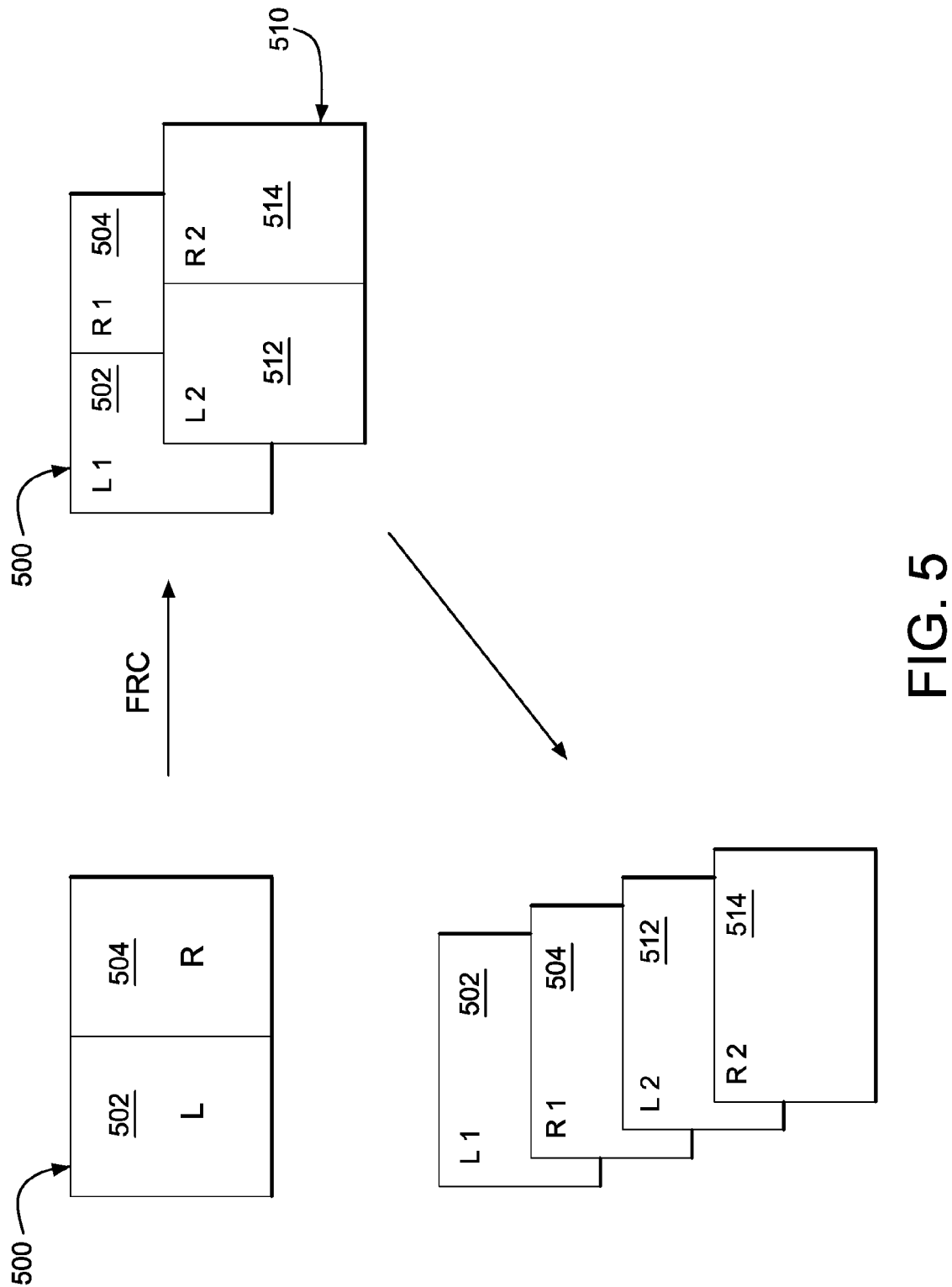

3D VIDEO PROCESSING

FIELD OF INVENTION

The present invention relates generally to video processing, and more particularly, to a method and apparatus for processing 3D video.

BACKGROUND

Current 3D content is based on a film source, which has a rate of 24 frame per second. Television broadcasts are at either a 50 Hz or a 60 Hz refresh rate. To convert a film source for television broadcast, there needs to be a frame rate conversion. This is typically accomplished by a frame rate conversion (FRC) process.

One way of performing FRC on a film source to a 60 Hz refresh rate is to use a 2:3 pulldown, in which a first frame is displayed twice and a second frame is displayed three times. This is repeated for each pair of frames in the film source. Because the frame rate for television is not the same as that for film, there is a motion judder problem (i.e., the viewer may notice that motion within the image is not smooth) introduced during the 2:3 pulldown.

Occlusion Problem

The output of the FRC process is a new (middle) frame that is placed between successive source frames. A problem with the new frame can arise if there is missing information regarding an obscured or hidden object in the background. If there is missing information, FRC cannot accurately produce the middle frame. This is referred to as the occlusion problem. If the middle frame is produced by motion estimation (determining a motion vector) and motion compensation (applying the motion vector to reduce the effects of motion), i.e., by the FRC process, then some immaterial images may be produced. This problem exists in both 2D images and in 3D images, where the hidden material can be in the left image, the right image, or both.

An example of an occlusion region is shown in FIG. 1, which shows five frames—a current frame (N), two previous frames (N−2, N−1), and two later frames (N+1, N+2). In normal FRC, an occlusion region shows no good matching motion vectors. If there is a motion vector field discontinuity in a homogeneous region, this could lead to potential occlusion regions because the correct motion vector could not be estimated due to the discontinuity. The motion vector discontinuity due to occlusion could be detected be comparing the motion vectors between frames N−2 and N−1 and between frames N−1 and N+1. To be able to handle the occlusion region correctly, more than four consecutive frames of data will be needed, creating a complex solution.

There is therefore a need to reduce judder when converting a film source, in particular with a 3D film source. There is also a need to address the occlusion problem in 3D sources.

SUMMARY

The judder problem can be addressed by separating a 3D image into its component left image and right image, performing FRC on the individual images, and then reordering the images for display. The separation and FRC processes can be reversed, in that FRC can be performed on the 3D image and the original and motion compensated images can be separated into their component left and right images.

One way to address the occlusion problem in 3D sources is to utilize the disparity information (the difference between the left image and the right image) to help generate the hidden information.

BRIEF DESCRIPTION OF THE DRAWINGS

A more detailed understanding of the invention may be had from the following description, given by way of example, and to be understood in conjunction with the accompanying drawings, wherein:

FIG. 2 is a flowchart of a method for performing FRC on a 3D input source;

FIG. 3 is a diagram showing an example application of the method of FIG. 2;

FIG. 4 is a flowchart of an alternate method for performing FRC on a 3D input source;

FIG. 5 is a diagram showing an example application of the method of FIG. 4;

DETAILED DESCRIPTION

Figure 1:
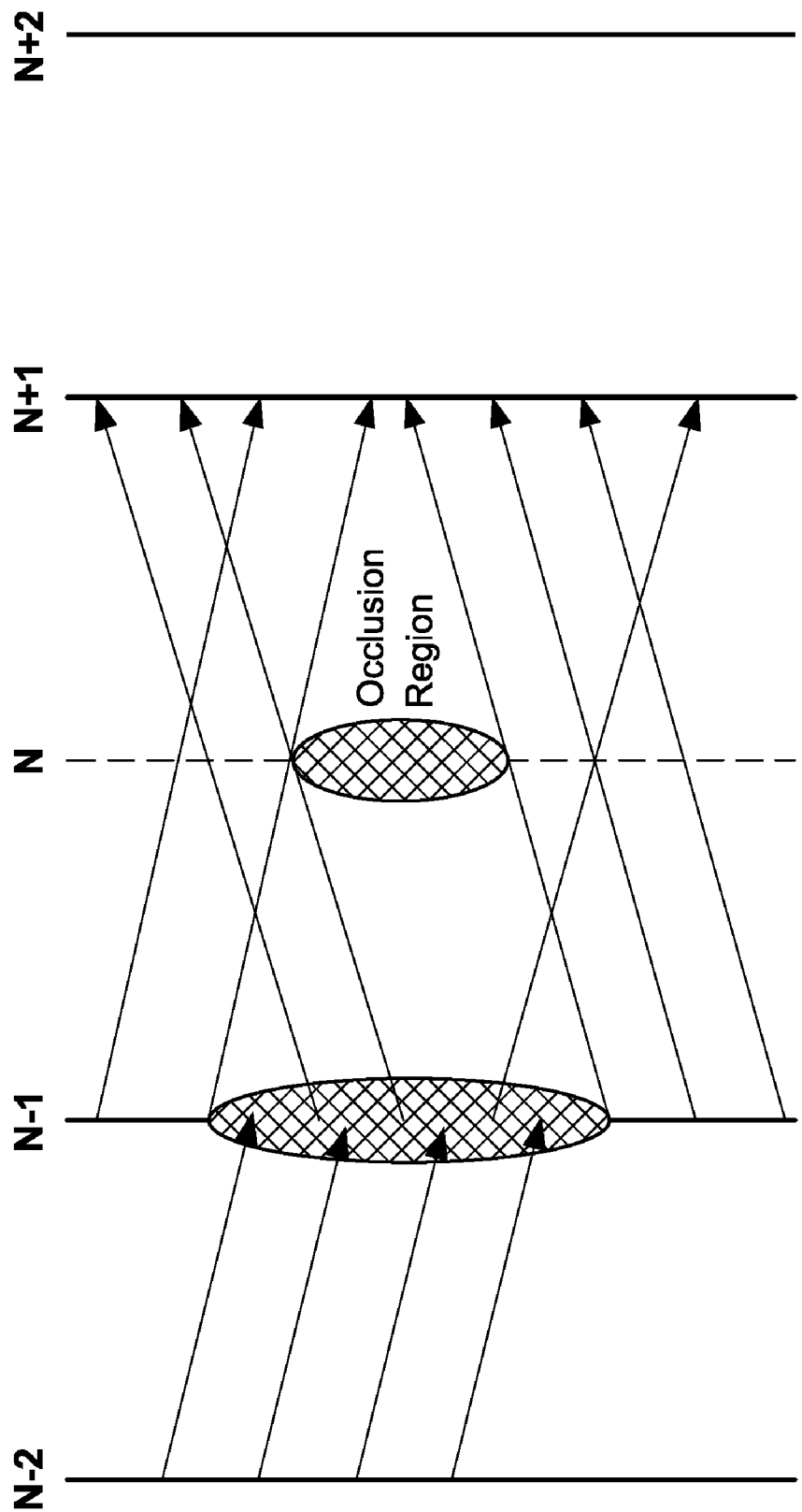
FIG. 1 is a diagram showing an example of an occlusion region.

One way to reduce the judder problem is via proper application of FRC. This can be achieved by using motion estimation and motion compensation during the FRC process. With a 3D input source, the motion estimation and motion compensation needs to be performed on both the left image and the right image of a 3D video frame. The left image and the right image need to be separated at some point during the process; the separation can occur before FRC (as shown in FIGS. 2 and 3) or after FRC (as shown in FIGS. 4 and 5).

It is noted that the computational complexity is approximately the same for both methods. With a 3D image, each left image and right image is half the size of a full frame. Processing (e.g., performing FRC) on a smaller size image is easier, and the method shown in FIG. 2 may complete faster than the method shown in FIG. 4.

Separation, then FRC

FIG. 2 is a flowchart of a method 200 for performing FRC on a 3D input source. A 3D frame is separated into a left image and a right image (step 202). A motion vector is calculated for the left image (step 204) and for the right image (step 206). It is noted that calculating the motion vectors for the left image and the right image (steps 204 and 206) can be reversed.

It is further noted that only one motion vector may be calculated, for either the left image or the right image, and that motion vector can be applied to the other image. The reasoning behind this possibility is that in most cases (approximately 95% on the time), the motion vector between the left image and the right image is very similar. A slight difference between the respective motion vectors (if calculated separately) should not have an effect. If the motion vectors between the left image and the right image are substantially different, then the disparity will be different and the motion vectors should be calculated separately. By calculating only one motion vector, the hardware complexity can be reduced; the determination whether only one motion vector is calculated can be based on the hardware present and is implementation-specific.

One exceptional case to note is when an object in the image is approaching only one eye. At a distance close to the viewer, there will be a large disparity between the images, and there will also be a large difference in the motion vectors. This is because the left image and the right image have different motions associated with them, since the object is moving in a different direction and at a different distance from each eye.

FRC is then performed on the left image (step 208) and on the right image (step 210). Performing the FRC (steps 208 and 210) can also be reversed, provided that the motion vectors are determined before FRC is performed. After FRC has been performed on both the left image and the right image, the converted images are reordered for display (step 212).

FIG. 3 is a diagram showing an example application of the method of FIG. 2. A 3D frame 300 is separated into a left image 302 and a right image 304. A motion vector ($MV_1$) 310 is calculated for the left image 302 and is applied to determine a motion compensated image (L2) 320. A motion vector ($MV_2$) 312 is calculated for the right image 304 and is applied to determine a motion compensated image (R2) 322. The original images 302, 304 and the motion compensated images 320, 322 are then reordered for display.

FRC, then Separation

FIG. 4 is a flowchart of an alternate method 400 for performing FRC on a 3D input source. A motion vector is calculated for the 3D image (step 402) and FRC is performed on the 3D image (step 404). Both the original 3D image and the motion compensated image are separated into left and right images (step 406). All of the images are then reordered for display (step 408).

FIG. 5 is a diagram showing an example application of the method 400. A 3D frame 500 includes a left image 502 and a right image 504. FRC is performed on the 3D frame 500, to generate a motion compensated frame 510, including a motion compensated left image (L2) 512 and a motion compensated right image (R2) 514. The original 3D image 500 and the motion compensated 3D image 510 are then separated into their respective left and right images 502, 504, 512, 514 and the individual images are reordered for display.

2D to 3D Extraction, then FRC

Figures 6, 8:
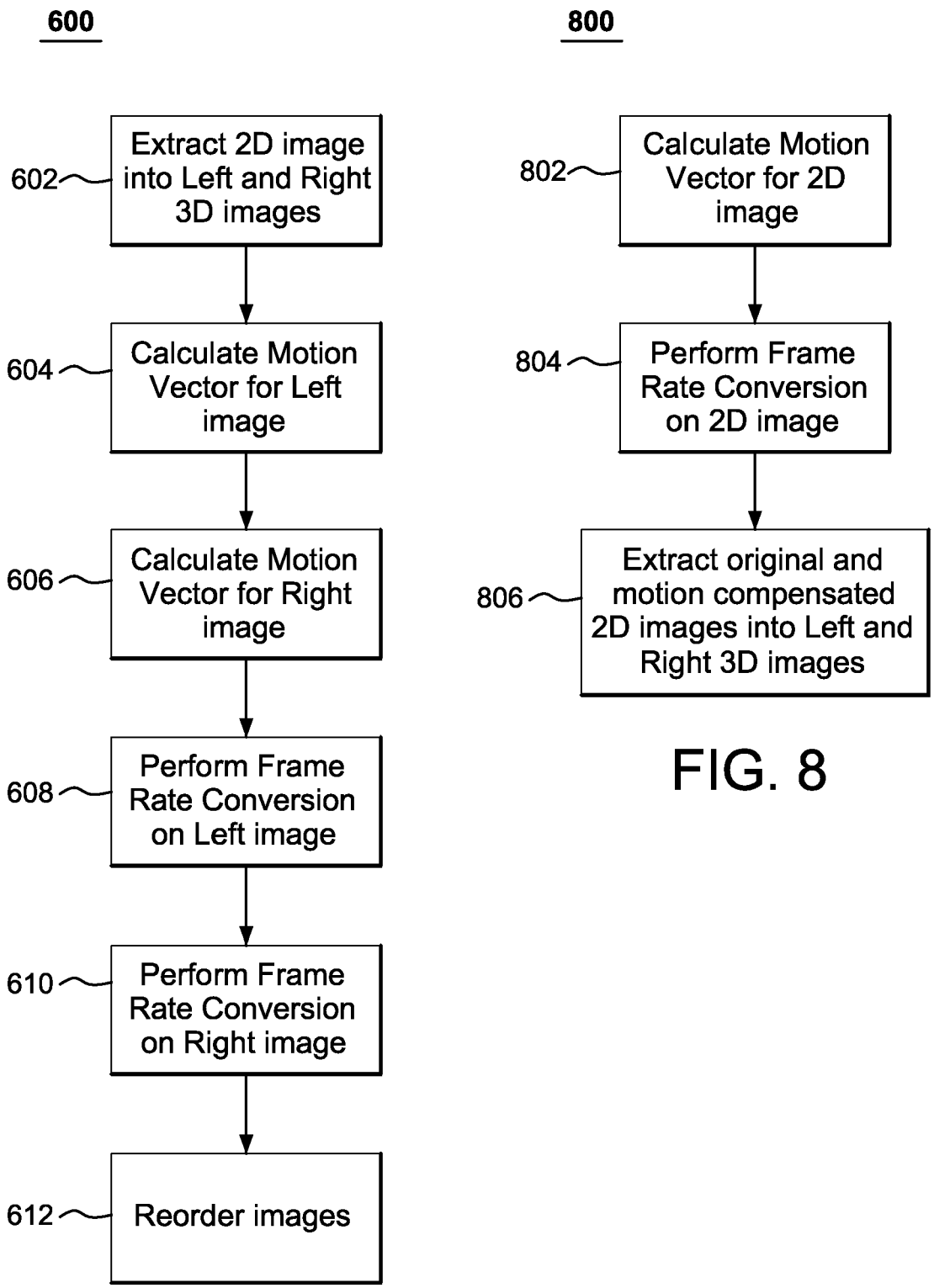
FIG. 6 is a flowchart of a method for performing 2D to 3D conversion.
FIG. 8 is a flowchart of an alternate method for performing 2D to 3D conversion.

FIG. 6 is a flowchart of a method 600 for performing 2D to 3D conversion. A 2D image is extracted into a 3D image, including a left image and a right image (step 602). A motion vector is calculated for the left image (step 604) and for the right image (step 606). It is noted that calculating the motion vectors for the left image and the right image (steps 604 and 606) can be reversed. It is further noted that only one motion vector may be calculated, for either the left image or the right image, and that motion vector can be applied to the other image.

FRC is then performed on the left image (step 608) and on the right image (step 610). Performing the FRC (steps 608 and 610) can also be reversed, provided that the motion vectors are determined before FRC is performed. After FRC has been performed on both the left image and the right image, the converted images are reordered for display (step 612).

Figure 7:
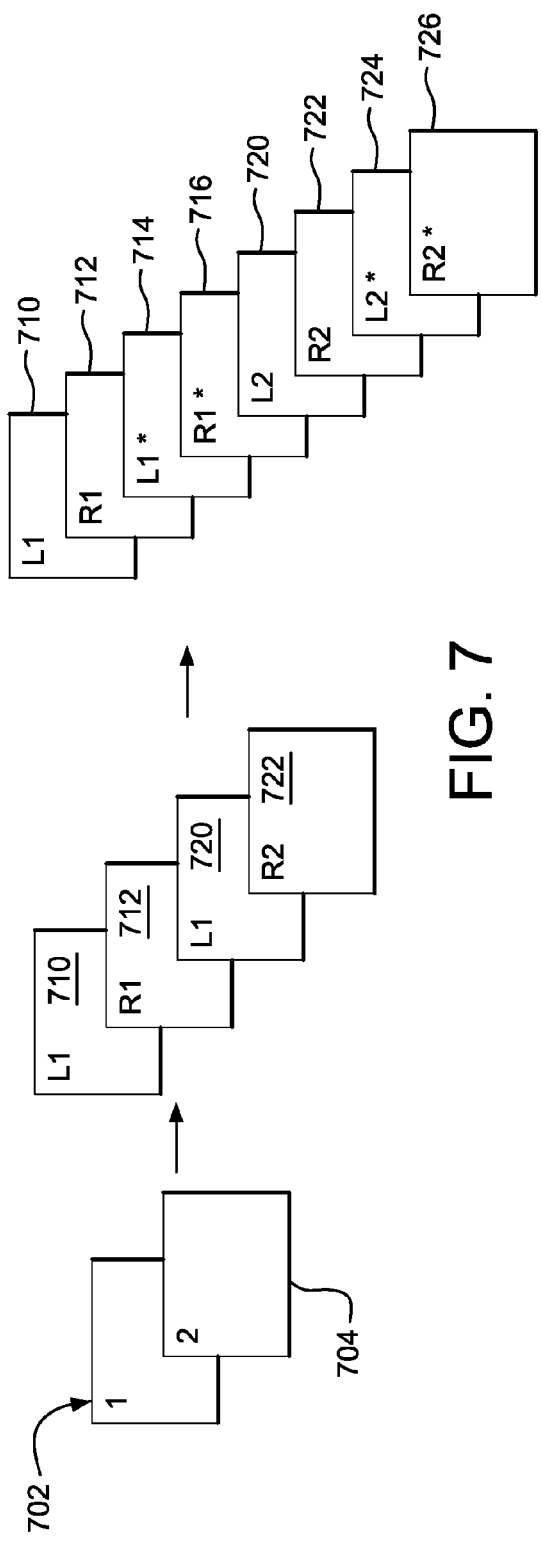
FIG. 7 is a diagram showing an example application of the method of FIG. 6.

FIG. 7 is a diagram showing an example application of the method of FIG. 6. Two 2D images 702, 704 are extracted into 3D images with left and right images 710, 712, 720, 722. FRC is then performed on the left and right images to produce motion compensated images L1* 714, R1* 716, L2* 724, and R2* 726. The original images 710, 712, 720, 722 and the motion compensated images 714, 716, 724, 726 are reordered for display.

FRC, then 2D to 3D Extraction

FIG. 8 is a flowchart of an alternate method 800 for performing 2D to 3D conversion. A motion vector is calculated for a 2D image (step 802) and FRC is performed on the 2D image (step 804). The original 2D image and the motion compensated 2D image are extracted into respective 3D images, including left images and right images (step 806).

Figure 9:
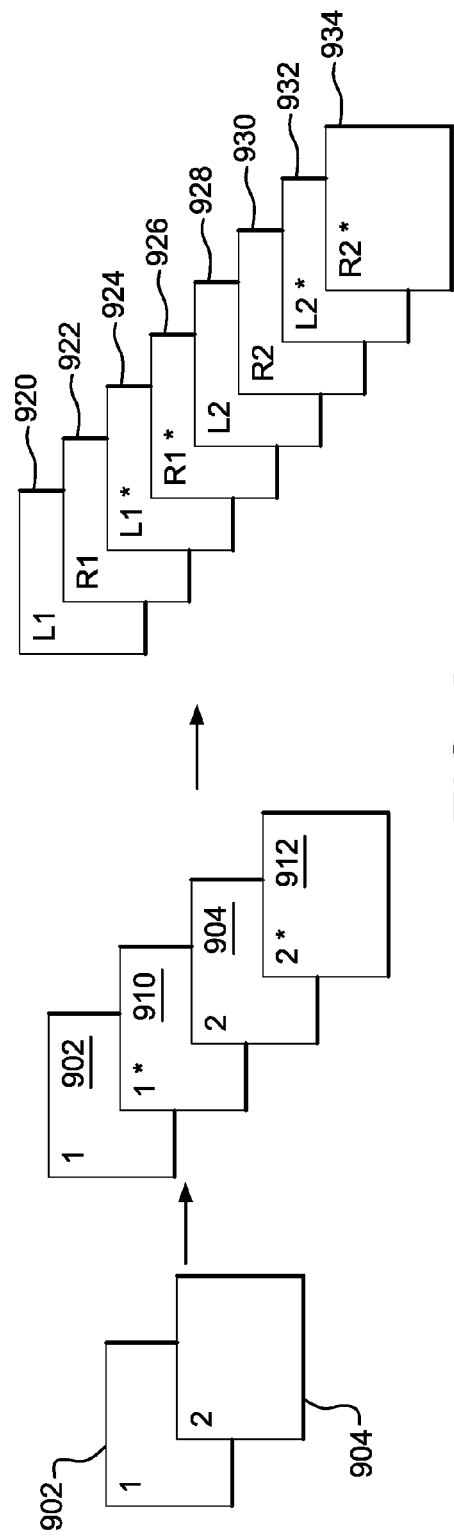
FIG. 9 is a diagram showing an example application of the method of FIG. 8.

FIG. 9 is a diagram showing an example application of the method of FIG. 8. FRC is performed on two 2D images 902, 904 to produce motion compensated images 1* 910 and 2* 912. The original 2D images 902, 904 and the motion compensated 2D images 910, 912 undergo 3D extraction into respective left and right images, to generate left and right images 920-934.

Apparatus Configured to Perform the Methods

Figure 10:
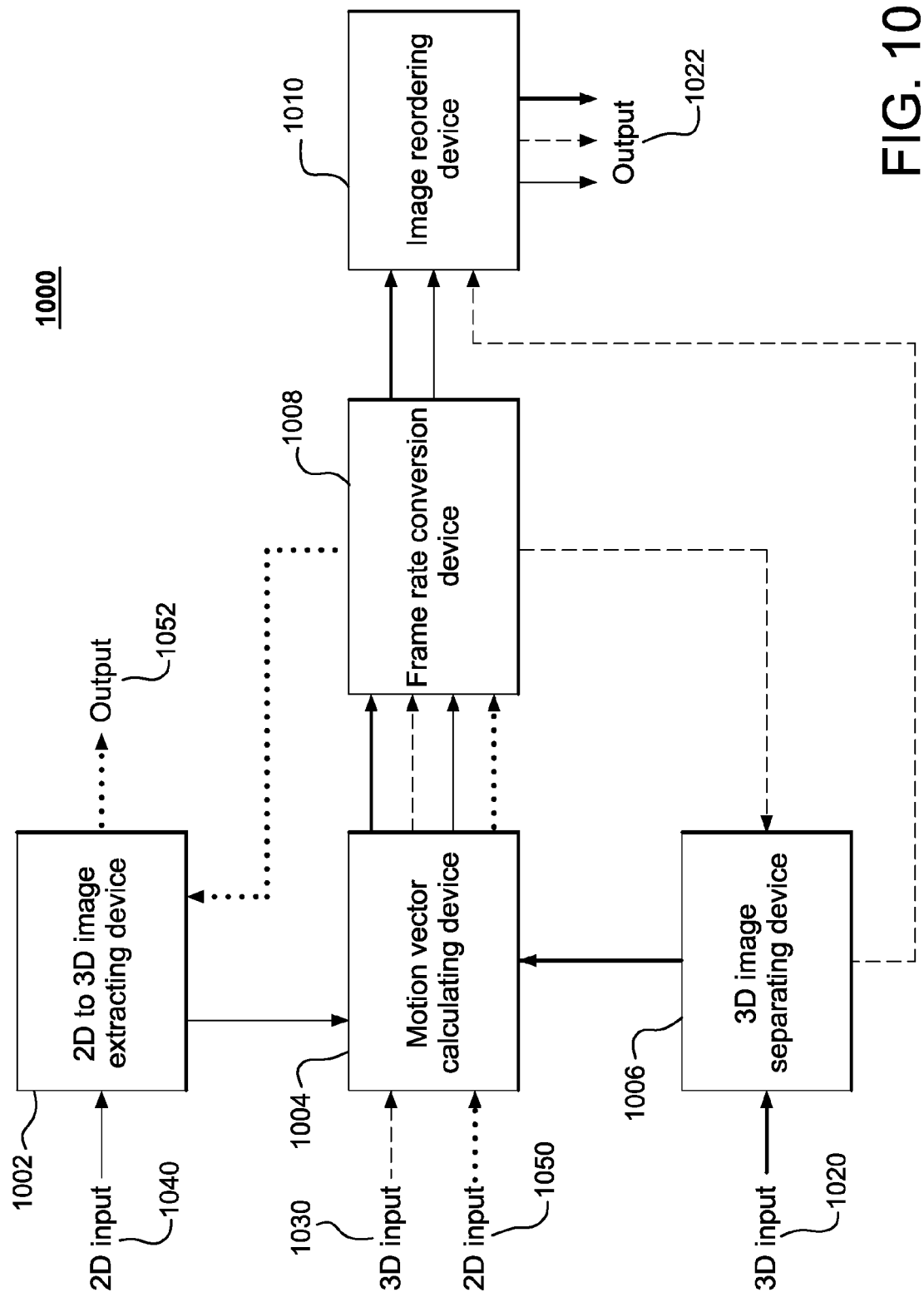
FIG. 10 is a block diagram of an apparatus configured to perform any of the methods of FIG. 2, 4, 6, or 8.

FIG. 10 is a block diagram of an apparatus 1000 configured to perform any of the methods 200, 400, 600, or 800. While the apparatus 1000 as shown is capable of performing any of the methods 200, 400, 600, or 800, the apparatus 1000 can be specifically configured to perform only one of the methods be removing unused components.

The apparatus 1000 includes a 2D to 3D image extracting device 1002, a motion vector calculating device 1004, a 3D image separating device 1006, a frame rate conversion device 1008, and an image reordering device 1010.

When performing the method 200, the apparatus 1000 operates as follows. A 3D input 1020 is provided to the 3D image separating device 1006, which separates the 3D input 1020 into left and right images. Motion vectors for the left and right images are calculated by the motion vector calculating device 1004. The frame rate conversion device 1008 performs FRC on the left and right images using the calculated motion vectors to produce motion compensated images. The left and right images and the motion compensated images are passed to the image reordering device 1010, where the images are reordered for display and are output 1022.

When performing the method 400, the apparatus 1000 operates as follows. A 3D input 1030 is provided to the motion vector calculating device 1004, which calculates the motion vector for the 3D input 1030. The frame rate conversion device 1008 performs FRC on the 3D input 1030 using the calculated motion vector to produce a motion compensated 3D image. The 3D input 1030 and the motion compensated 3D image are passed to the 3D input 1030 separating device 1006, which generates left and right images from the 3D image and left and right images from the motion compensated 3D image. The original left and right images and the motion compensated left and right images are passed to the image reordering device 1010, where the images are reordered for display and are output 1022.

When performing the method 600, the apparatus 1000 operates as follows. A 2D input 1040 is provided to the 2D to 3D image extracting device 1002, which extracts the 2D input 1040 into left and right 3D images. The motion vector calculating device 1004 calculates motion vectors for the left and right images. The frame rate conversion device 1008 performs FRC on the left and right images using the calculated motion vectors to produce motion compensated left and right images. The left and right images and the motion compensated left and right images are passed to the image reordering device 1010, where the images are reordered for display and are output 1022.

When performing the method 800, the apparatus 1000 operates as follows. A 2D input 1050 is provided to the motion vector calculating device 1004, which calculates the motion vector for the 2D input 1050. The frame rate conversion device 1008 performs FRC on the 2D input 1050 using the calculated motion vector to produce a motion compensated image. The 2D input 1050 and the motion compensated image are passed to the 2D to 3D image extracting device 1002, which extracts the 2D input 1050 and the motion compensated image into left and right 3D images and produces an output 1052.

Addressing the Occlusion Problem

The occlusion problem in 3D images can be addressed by using both the left image and the right image together during FRC. The two images may contain the information missing from a 2D image due to the different information contained in the left image and the right image (also referred to as disparity information).

Figure 11:
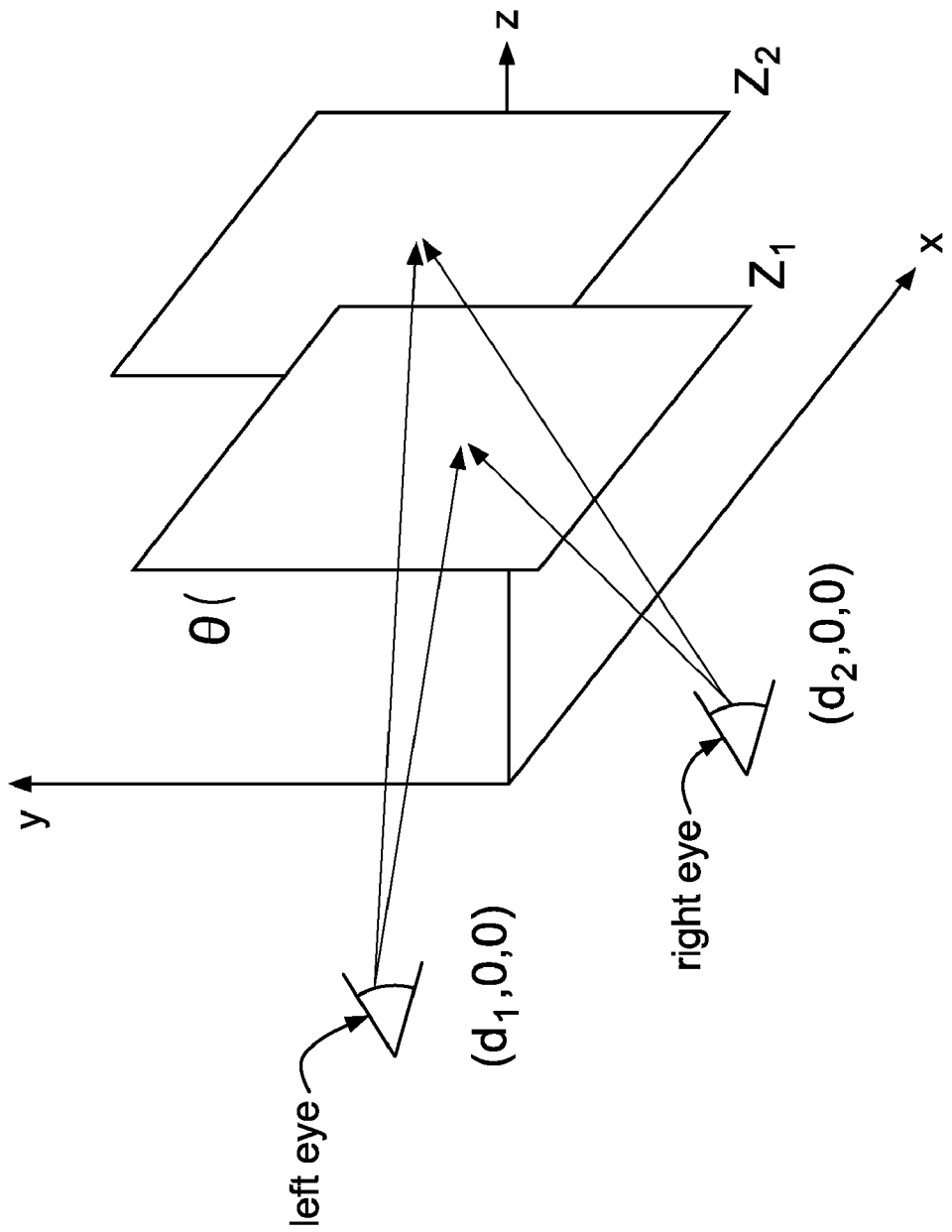
FIG. 11 is a diagram showing how 3D images assist in addressing the occlusion problem.

FIG. 11 is a diagram showing how 3D images assist in addressing the occlusion problem. The viewer's left eye is at a first coordinate $d_1$ along the X-axis and the viewer's right eye is at a second coordinate $d_2$ along the X-axis. There is a viewing angle $\theta$ between the left and right eyes relative to the plane $z_1$. By changing the angle $\theta$ or the position of the left or right eye ($d_1$ or $d_2$), more information can be obtained for images in the background (plane $z_2$) as compared to images in the foreground (plane $z_1$). The additional information in a 3D image (on plane $z_2$) can be used to address the occlusion problem.

Generally, motion estimation in block matching can be stated as, for example, the calculation of the minimization of the mean absolute difference (MAD) between the viewer's left and right eyes ($d_1$ and $d_2$).

$$MAD(d_1, d_2) = \frac{1}{N_1 N_2} \sum_{(n_1, n_2) \in B} [s(n_1, n_2, k) - s(n_1 + d_1, n_2 + d_2, k+1)] \quad \text{Equation (1)}$$

$$[d_1, d_2]^T = \arg\min_{(d_1, d_2)} MAD(d_1, d_2) \quad \text{Equation (2)}$$

where B denotes an $N_1 \times N_2$ block for a set of candidate motion vectors ($d_1$, $d_2$) and signal s is at a pixel ($n_1$, $n_2$) in frame k (shown in FIG. 11 as frame $Z_1$). T represents the transpose of the motion vectors $d_1$, $d_2$.

Figure 12:
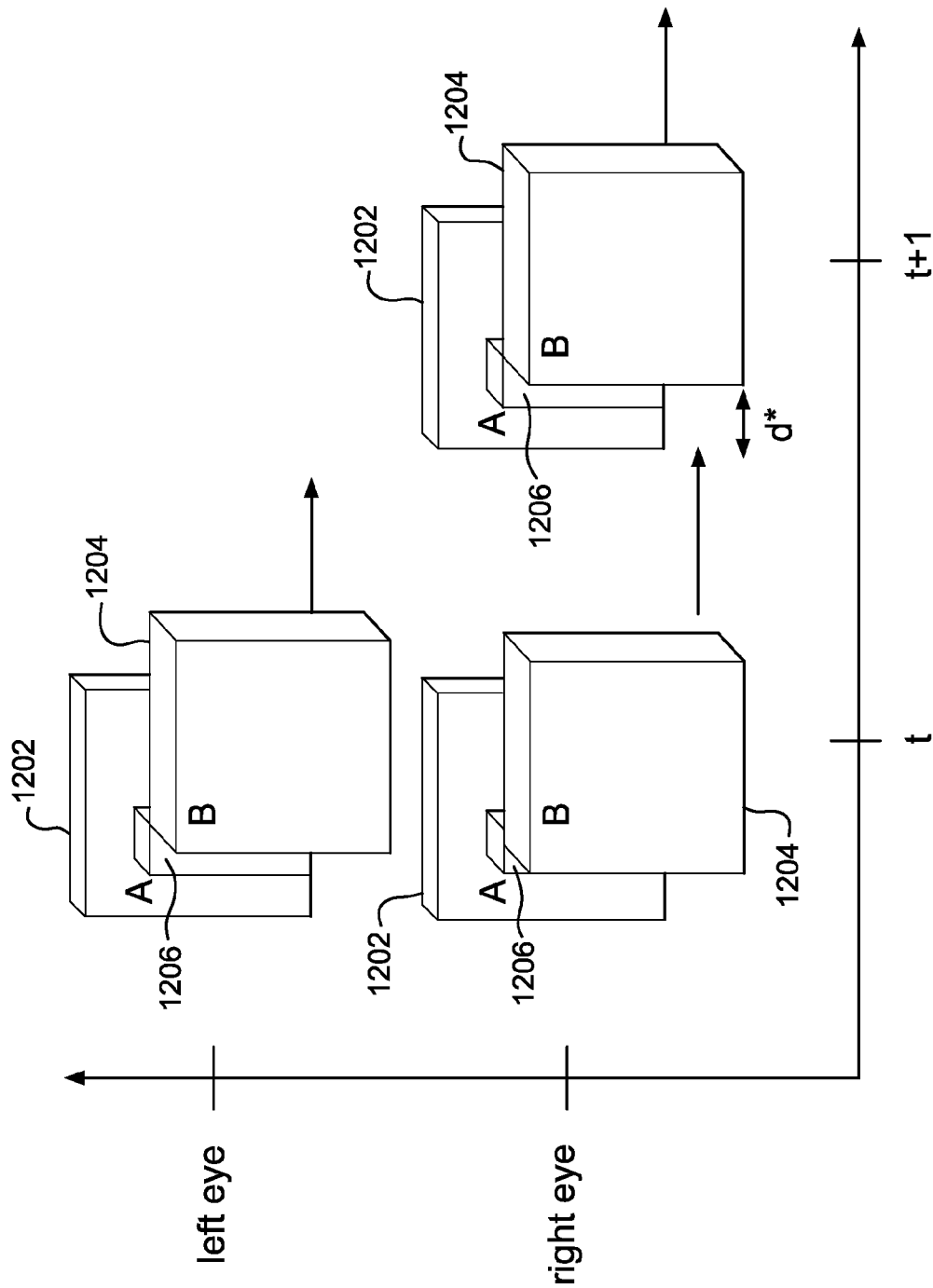
FIG. 12 is a diagram showing an example of disparity between what a viewer's left eye and right eye sees in a 3D image.

FIG. 12 is a diagram showing an example of disparity between what a viewer's left eye and right eye sees in a 3D image. At time t, the viewer can see at least a portion of block A 1202, block B 1204, and block C 1206. Based on the relative positioning of block C 1206 between block A 1202 and block B 1204, the viewer can see more of block C 1206 with their left eye than with their right eye.

At time t+1, block B 1204 has moved to the right and the viewer can see more of block C 1206 with their right eye. Ideally, when the motion vector from time t to time t+1 is comparable to the disparity, the angle $\theta$ can be defined as:

$$\theta \approx 2\tan^{-1}\left(\frac{d^*}{z}\right) \quad \text{Equation (3)}$$

$$d^* = d^*(\vec{v}) \quad \text{Equation (4)}$$

$$\text{Disparity} \approx \frac{2d}{z} \quad \text{Equation (5)}$$

where v is a motion vector, d is a disparity vector, and d* is the distance between the viewer's left eye view and the viewer's right eye view.

Figure 13:
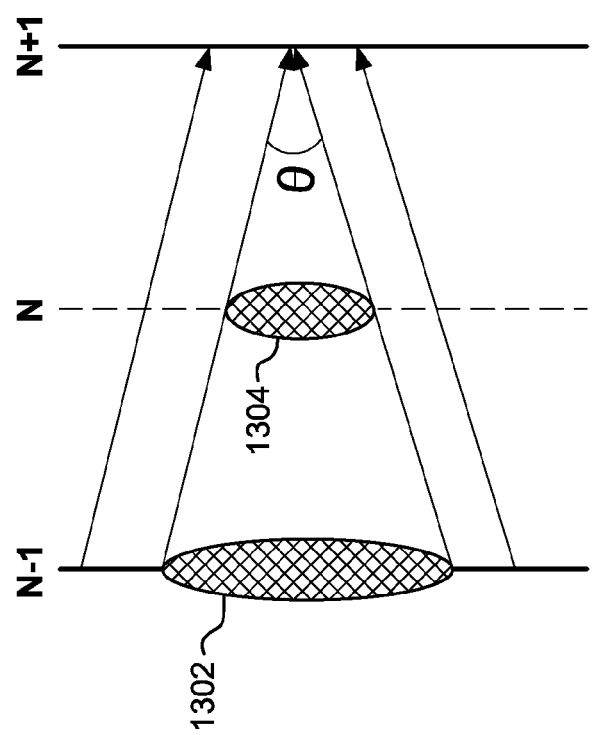
FIG. 13 is a diagram showing how background information in a 3D image can be obtained by using the disparity.

FIG. 13 is a diagram showing how background information in a 3D image can be obtained by using the disparity. The covered portion in the image (block C 1206) is handled in a similar manner as an occlusion is handled in a normal FRC process. In frame N−1, there is an occlusion region 1302. Continuing the example from FIG. 12, the occlusion region 1302 is the amount of block C 1206 that is hidden at time t. In the current frame N, there is an occlusion region 1304 (the amount of block C 1206 that is hidden at time t+1). Motion vectors are calculated by using the normal FRC process, based on frames N−1 and N+1. The motion vectors are corrected based on the disparity information (via a disparity to motion vector conversion). Motion compensation is then performed based on the corrected motion vectors.

Figure 14:
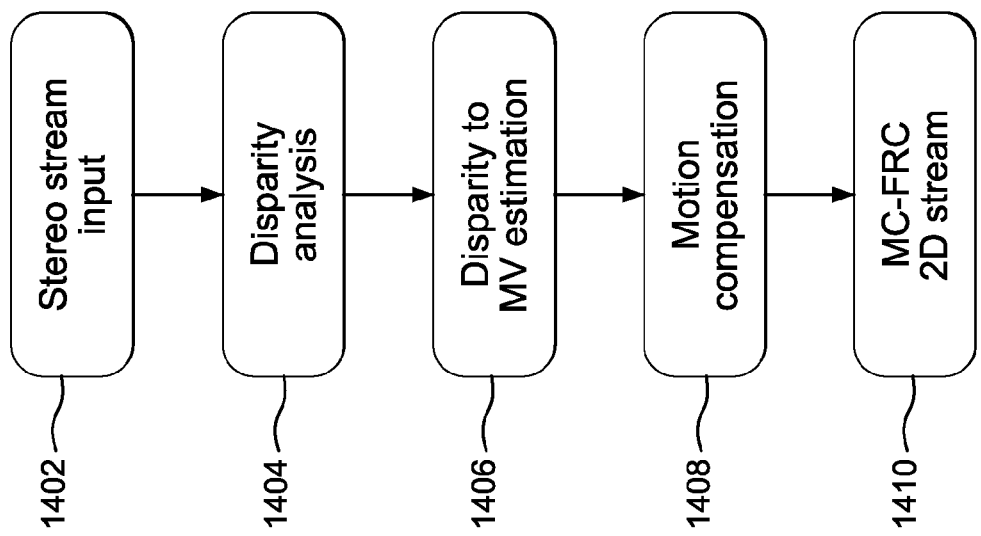
FIG. 14 is a flowchart of a method for addressing the occlusion problem.

FIG. 14 is a flowchart of a method 1400 for addressing the occlusion problem. A stereo stream (the left and right images of a 3D video stream) is provided (step 1402). A disparity analysis is performed on the received stream (step 1404). The motion vector is estimated based on the result of the disparity analysis (step 1406) and motion compensation is performed, utilizing the motion vector (step 1408).

FRC is then performed on the 2D stream (step 1410). This step includes separately performing FRC on the left image and the right image (each a 2D stream). 2D FRC can also be used in cases where there is a 3D input, but only a 2D display, and therefore, the FRC output needs to be a 2D stream.

The present invention can be implemented in a computer program tangibly embodied in a computer-readable storage medium containing a set of instructions for execution by a processor or a general purpose computer; and method steps can be performed by a processor executing a program of instructions by operating on input data and generating output data. Suitable processors include, by way of example, both general and special purpose processors. Typically, a processor will receive instructions and data from a read-only memory (ROM), a random access memory (RAM), and/or a storage device. Storage devices suitable for embodying computer program instructions and data include all forms of non-volatile memory, including by way of example semiconductor memory devices, magnetic media such as internal hard disks and removable disks, magneto-optical media, and optical media such as CD-ROM disks and digital versatile disks (DVDs). In addition, while the illustrative embodiments may be implemented in computer software, the functions within the illustrative embodiments may alternatively be embodied in part or in whole using hardware components such as Application Specific Integrated Circuits (ASICs), Field Programmable Gate Arrays (FPGAs), or other hardware, or in some combination of hardware components and software components.

While specific embodiments of the present invention have been shown and described, many modifications and variations could be made by one skilled in the art without departing from the scope of the invention. The above description serves to illustrate and not limit the particular invention in any way.

What is claimed is:

1. A method for reducing motion judder in a 3D input source, comprising:
  separating the 3D input source into left and right images;
  calculating a motion vector for each of the left image and the right image;
  performing frame rate conversion on the left image and the right image, using the respective calculated motion vectors, to produce motion compensated left and right images; and
  reordering the left and right images and the motion compensated left and right images for display.

2. A method for reducing motion judder in a 3D input source, comprising:
  calculating a motion vector for the 3D input source;
  performing frame rate conversion on the 3D input source, using the calculated motion vector, to produce a motion compensated 3D image;
  separating the 3D input source into respective left and right input images and separating the motion compensated 3D image into respective motion compensated left and right images; and
  reordering the left and right input images and the motion compensated left and right images for display.

3. An apparatus configured to reduce motion judder in a 3D input source, comprising:
  a 3D image separating device, configured to separate a 3D image into a left image and a right image;
  a motion vector calculating device, configured to calculate a motion vector for the left image and the right image;
  a frame rate conversion device, configured to produce a motion compensated left image and right image based on an input left image and right image and the respective calculated motion vectors; and
  an image reordering device, configured to reorder separated input left and right images and separated motion compensated left and right images for display.

4. The apparatus according to claim 3, wherein the motion vector calculating device is further configured to operate on a 3D image and to calculate a motion vector for the 3D image.

5. The apparatus according to claim 4, wherein the frame rate conversion device is further configured to operate on the 3D image.

* * * * *